(12) United States Patent
Jager

(10) Patent No.: US 8,574,044 B2
(45) Date of Patent: Nov. 5, 2013

(54) BELLY HOOK ASSEMBLY FOR A CONVEYOR

(75) Inventor: Todd Jager, Sioux City, IA (US)

(73) Assignee: Industrial Design Fabrication & Installation, Inc., Sioux City, IA (US)

( * ) Notice: Subject to any disclaimer, the term of this patent is extended or adjusted under 35 U.S.C. 154(b) by 570 days.

(21) Appl. No.: 12/854,655

(22) Filed: Aug. 11, 2010

(65) Prior Publication Data

US 2012/0040598 A1 Feb. 16, 2012

(51) Int. Cl.
*A22B 7/00* (2006.01)
(52) U.S. Cl.
USPC .......................................................... 452/177
(58) Field of Classification Search
USPC .................................................. 452/177–184
See application file for complete search history.

(56) References Cited

U.S. PATENT DOCUMENTS

| | | | |
|---|---|---|---|
| 4,662,029 A | 5/1987 | Helsene et al. | |
| 4,832,183 A | 5/1989 | Lapeyre | |
| 5,458,051 A | 10/1995 | Alden et al. | |
| 5,544,740 A | 8/1996 | Kissee | |
| 5,597,156 A | 1/1997 | Claassen | |
| 5,601,180 A | 2/1997 | Steeber et al. | |
| 5,810,149 A | 9/1998 | Sandberg et al. | |
| 6,152,284 A | 11/2000 | Sandberg et al. | |
| 6,155,919 A | 12/2000 | Haagensen et al. | |
| 6,390,285 B2 | 5/2002 | de Geus et al. | |
| 6,467,668 B1 * | 10/2002 | Basile et al. | 226/104 |
| 6,468,142 B1 * | 10/2002 | Deyerle et al. | 452/20 |
| 6,497,610 B1 | 12/2002 | Reichert | |
| 6,554,129 B2 | 4/2003 | Straight et al. | |
| 7,059,954 B2 | 6/2006 | Annema et al. | |
| 7,097,030 B2 | 8/2006 | Gundlach | |
| 7,234,589 B2 | 6/2007 | Sedlacek | |
| 7,255,227 B2 | 8/2007 | Melancon | |
| 7,344,437 B2 * | 3/2008 | Van Den Nieuwelaar et al. | 452/187 |
| 7,364,038 B2 | 4/2008 | Damkjaer | |
| 7,445,544 B2 | 11/2008 | Niemiec | |
| 7,494,006 B2 | 2/2009 | Knott et al. | |
| 7,527,143 B2 | 5/2009 | Krisl et al. | |
| 7,614,941 B2 * | 11/2009 | van den Nieuwelaar et al. | 452/185 |
| 7,628,684 B2 | 12/2009 | Jagusch | |
| 7,824,251 B2 * | 11/2010 | van den Nieuwelaar et al. | 452/185 |
| 2001/0017254 A1 | 8/2001 | Geus et al. | |
| 2002/0090903 A1 | 7/2002 | Annema et al. | |
| 2004/0079621 A1 | 4/2004 | Mott | |
| 2004/0086610 A1 | 5/2004 | Allan Falk et al. | |
| 2006/0006050 A1 | 1/2006 | Sedlacek | |

(Continued)

OTHER PUBLICATIONS

Intralox, Modular Plastic Conveyor Belting, www.intralox.com, Jul. 7, 2010.

*Primary Examiner* — Richard Price, Jr.
(74) *Attorney, Agent, or Firm* — Boardman & Clark LLP

(57) ABSTRACT

A belly hook attachment is provided. The belly hook attachment has a first support arm, a second support arm spaced from the first arm, the first support arm and second support arm receiving first, second and third pins. A belly hook support arm is carried by the first pin and pivotable about the first pin. A belly hook is carried by the belly hook support arm. A translational member is also carried by the belly hook support arm and is engagable with a track on a conveyor assembly such that the interaction between the track and the translational member results in pivotal movement of the belly hook support arm about the pin between the second pin forming an upper stop and third pin forming a lower stop, thereby moving the belly hook. A modular conveyor belt is also provided.

5 Claims, 9 Drawing Sheets

(56) References Cited

U.S. PATENT DOCUMENTS

| | | |
|---|---|---|
| 2006/0030251 A1 | 2/2006 | Dufour et al. |
| 2006/0081449 A1 | 4/2006 | Gundlach |
| 2006/0108204 A1 | 5/2006 | Marsetti |
| 2006/0219530 A1 | 10/2006 | Melancon |
| 2007/0089970 A1 | 4/2007 | Damkjaer |
| 2008/0099312 A1 | 5/2008 | Lucchi |
| 2008/0176500 A1 | 7/2008 | Jagusch |
| 2009/0057108 A1 | 3/2009 | Paardekooper et al. |

\* cited by examiner

BELLY HOOK ASSEMBLY FOR A CONVEYOR

FIELD OF INVENTION

The present invention relates to modular belt conveyors, and in particular food product belly hook assemblies for use with modular belt conveyors.

BACKGROUND

It is known to use conveyor systems including conveyor belts in many industries to transport product. Conveyor belts and systems in the food industry must be cleaned continuously and effectively to keep the belts and systems sanitary. Modular plastic belts or chains are frequently used in the food industry as they are cleanable.

Unfortunately, current hook devices used to secure product, such as meat or other food product, on a conveyor belt are not efficient for use with a modular conveyor belt. Current belly hook assemblies include belly hooks which engage the meat product from above the conveyor or more specifically from above the conveyor belt. A belly hook which is engaged with the product from above causes obstacles for an operator who must cut the meat product, or to machinery through which the meat product must pass. Moreover, these hook assemblies are often difficult to clean, leading to problems maintaining a sanitary conveyor system. Furthermore, current belly hook systems are prone to bind or jam, are heavy, and are generally cumbersome to install and use. Current hook assemblies also carry a high maintenance cost.

Accordingly, what is needed in the art is belly hook assembly which is easy to install, use, and maintain in a sanitary condition with a modular conveyor belt.

SUMMARY OF THE INVENTION

A belly hook attachment is provided. The belly hook attachment has a first support arm, a second support arm spaced from the first arm, the first support arm and second support arm receiving first, second and third pins. A belly hook support arm is carried by the first pin and pivotable about the first pin. A belly hook is carried by the belly hook support arm. A translational member is also carried by the belly hook support arm and is engagable with a track on a conveyor assembly such that the interaction between the track and the translational member results in pivotal movement of the belly hook support arm about the first pin between the second pin forming an upper stop and third pin forming a lower stop, thereby moving the belly hook.

A modular conveyor belt is also provided. The modular conveyor belt has a plurality of links secured together by laterally disposed pins to form a conveyor belt and a belly hook link having an aperture. A belly hook attachment is provided having a first support arm, a second support arm spaced from the first arm, the first support arm and second support arm receiving first, second and third pins. A belly hook support arm is carried by the first pin and pivotable about the first pin. A belly hook is carried by the belly hook support arm. A translational member is also carried by the belly hook support arm and is engagable with a track on a conveyor assembly such that the interaction between the track and the translational member results in pivotal movement of the belly hook support arm about the first pin between the second pin forming an upper stop and third pin forming a lower stop, and resulting in corresponding movement of the belly hook between a lowered position in which the belly hook support arm is in contact with the third pin and the belly hook is recessed below a top surface of the conveyor belt in the aperture, and a raised position in which the belly hook support arm is in contact with the second pin and a portion of the belly hook is extended through the aperture above the top surface of the conveyor belt.

DETAILED DESCRIPTION OF PREFERRED EMBODIMENTS

While the disclosure herein is particularly described with regard to modular conveyors used in the food industry for use in conveying meat, poultry and agricultural products, it will be understood and apparent to those of skill in the art that the present invention has other applications where sanitary conveyor belts may be important.

Figure 1:
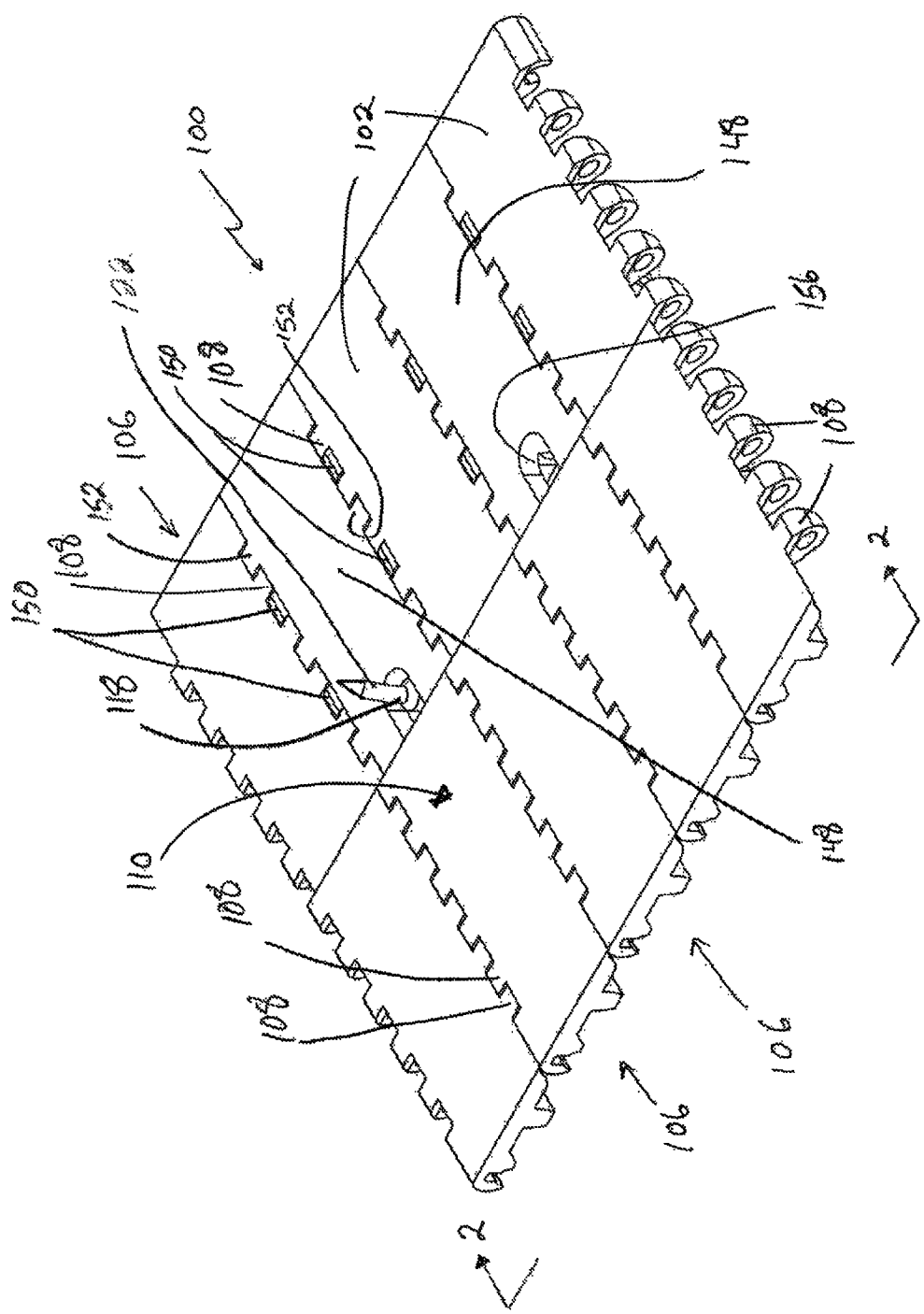
FIG. 1 is a partial perspective view of a modular conveyor belt having two belly hook attachments secured thereon.
Figure 2:
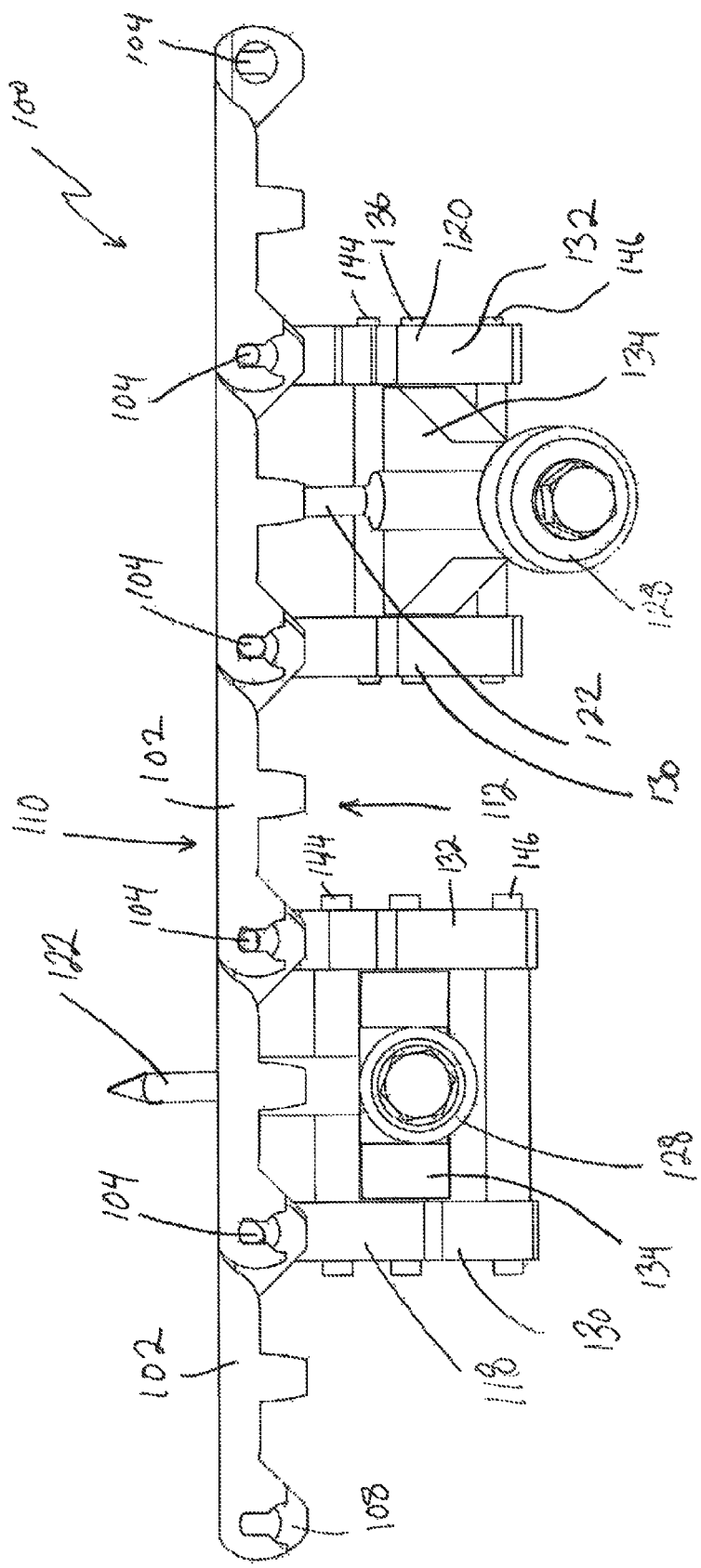
FIG. 2 is a side elevation view of the modular conveyor belt shown in FIG. 1, taken from line 2-2 of FIG. 1.

Generally, the modular conveyor belt 100 is constructed of one or more rows of plastic or thermoplastic belt links 102 formed by any suitable plastic material such as but not limited to polypropylene, polyethylene, and acetal. The belt links 102 are connected together by hinge pins 104 forming joints. The modular conveyor belt 100 may be constructed of a series of rows of links 106, each row having one or more links 102. When multiple links 102 are used to form a row, for example laid end-to-end, the modular conveyor belt 100 may be laid out in a brick lay pattern with adjacent rows of links 106, although such an arrangement is not required. FIGS. 1-2 illustrate a portion of a modular conveyor belt 100 having links 102 laid out in adjacent rows. Rows of links 106 are connected by hinge pins 104 inserted through interleaved or aligned receptors 108 or apertures in each link 102 that form passageways between the rows. The length of the rows, the number of rows, and size of links may be varied, resulting in numerous combinations and varying sizes of conveyor belt 100. The connected links 102 may form an endless belt loop having an outer conveying surface 110 and an opposite inner surface 112. The outer conveying surface 110 may be a flat article-conveying surface, although any combination or number of accessories by be added to the belt either integrally or detachably. Examples of accessories include, but are not limited to, side guards, flights, rollers, tabs, guides, and various inserts.

The modular conveyor belt 100 may be used on a conveyor system which articulates the belt about a sprocket or more than one sprocket. The conveyor system may also be power-driven by a suitable drive mechanism (not shown) driving the rotation of the sprocket which correspondingly moves the conveyor belt 100.

While specific examples are given, any suitable arrangement of a conveyor assembly or system and conveyor components may be acceptable for the purposes provided.

One or more belly hook attachments may 118, 120 be attached to a conveyor belt 100. In the illustrated example, the modular conveyor belt 100 has a plurality of belly hook attachments 118, 120 secured thereto as shown in FIGS. 1-8. Multiple belly hook attachments 118, 120 may be arranged spaced apart along the belt 100 and may be oriented in the same lateral position or may vary in position. Spacing between adjacent belly hook attachments may be suitable for use in attaching product, and in this regard may be spaced apart by one or more inches, or may be spaced apart by one or more feet, and in one example adjacent belly hook attachments may be spaced approximately five to ten inches apart. Any suitable spacing for the operator's needs may be acceptable for the purposes provided. In the illustrated example shown in FIGS. 1 and 2, one belly hook attachment 118 is shown in a raised position and one belly hook attachment 120 is shown in the lowered position. As best seen in FIG. 2, in the raised position a hook 122 extends above the outer conveying surface 110 of the belt 100. In the lowered position, the hook 122 is recessed below the outer conveying surface 110 of the belt 100 and may be positioned below the belt 100.

Figure 3:
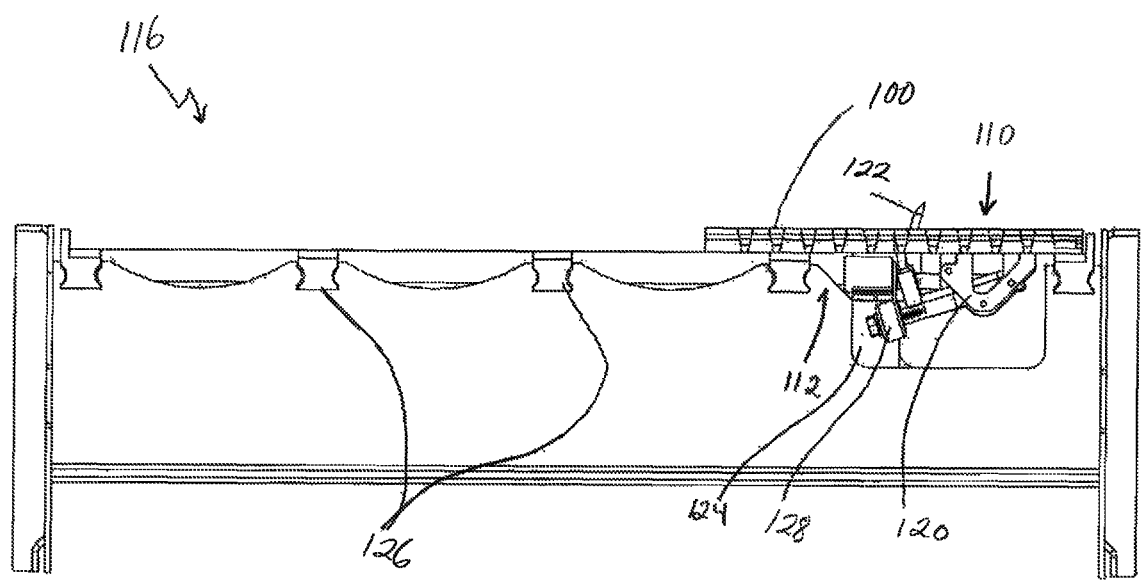
FIG. 3 is a cut-away end elevation view of one or more examples of a conveyor assembly having a portion of a modular conveyor belt shown in FIG. 1 thereon.
Figure 4:
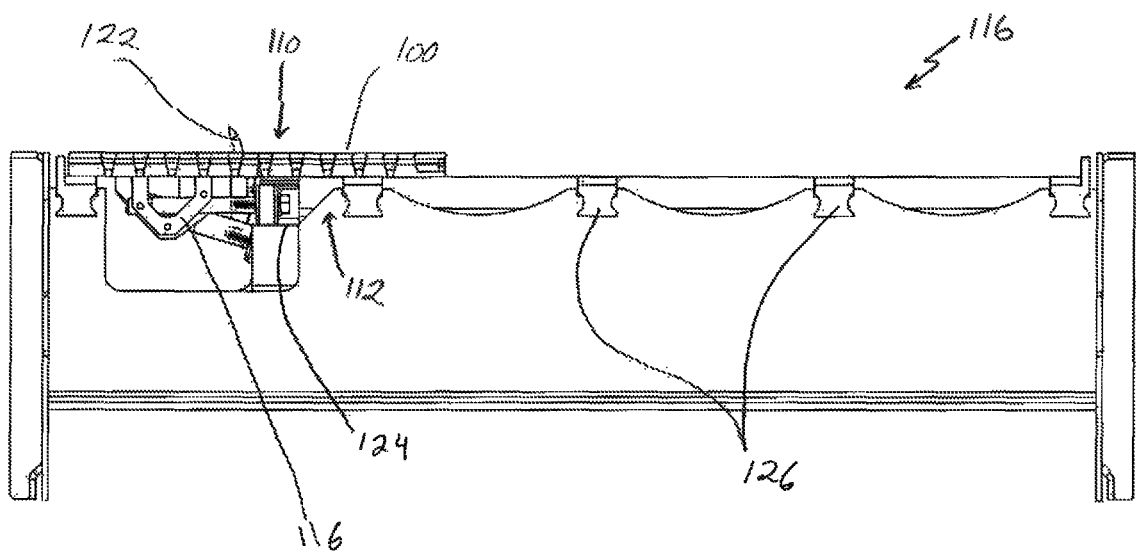
FIG. 4 is a cut-away end elevation view of one or more examples of a conveyor assembly having a portion of a modular conveyor belt shown in FIG. 1 thereon, shown from the view opposite FIG. 3.
Figure 5:
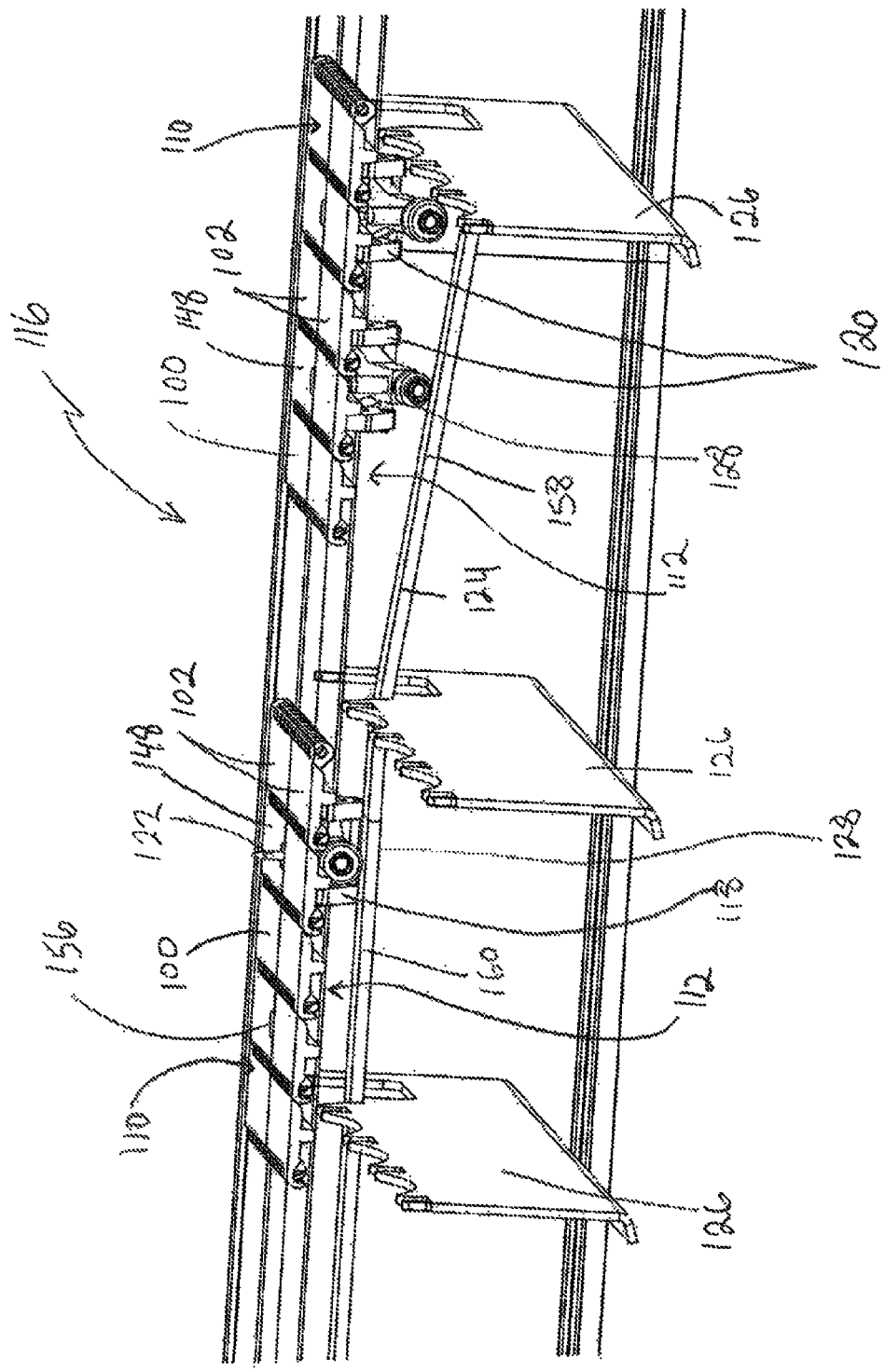
FIG. 5 is a cut-away partial side perspective view of the conveyor assembly shown in FIG. 3.
Figure 6:
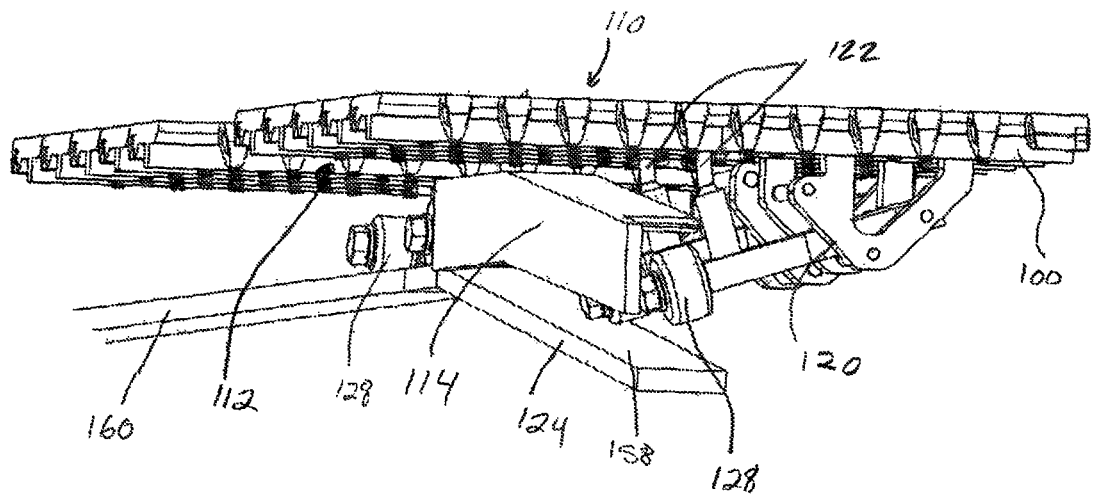
FIG. 6 is an end perspective view of the partial modular conveyor belt, a plurality of belly hook attachments, and track or guide bars shown in FIG. 5.
Figure 7:
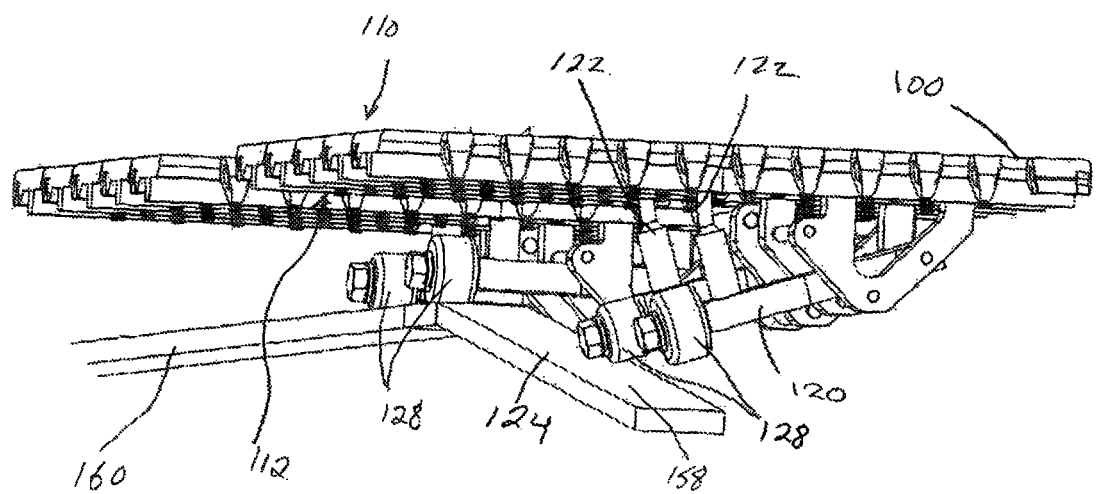
FIG. 7 is an end perspective view of the partial modular conveyor belt, a plurality of belly hook attachments, and track or guide bars shown in FIG. 6, without the upper bar.
Figure 8:
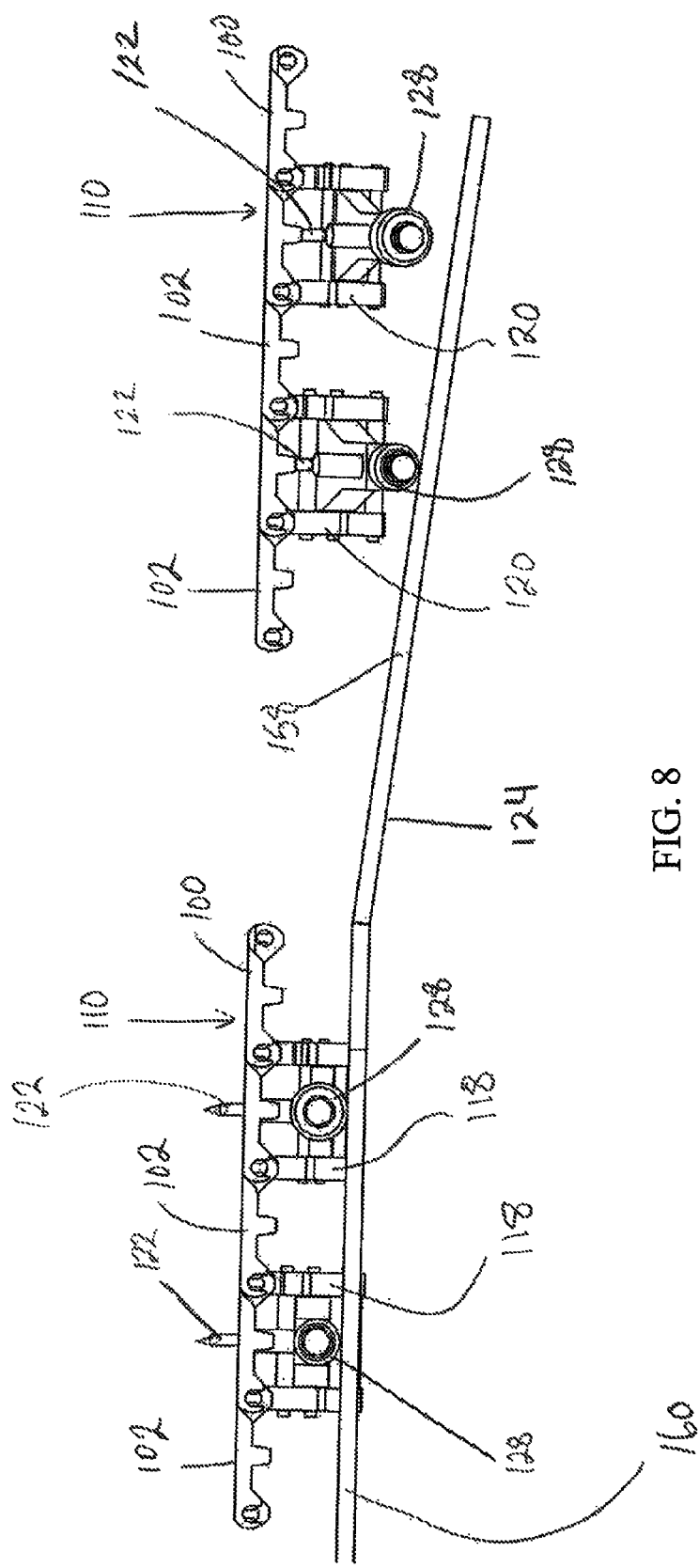
FIG. 8 is a side elevation view of the assembly shown in FIG. 7.

The modular conveyor belt 100 and belly hook attachments 118, 120 may be assembled with a larger conveyor assembly 116 as shown in FIGS. 3-5. In the example provided, the belly hook attachments 118, 120 are carried by the conveyor belt 100 between the outer edges of the belt. In one or more examples of embodiments, the belly hook attachment 118, 120 is positioned on the conveyor assembly 116 above a track 124 or rib mounted below the belt 100 and passing through apertures in carryway supports 126. The translational member 128, shown as a wheel in the Figures, of the belly hook attachment 118, 120 is arranged to ride on the track 124 as the belt 100 and belly hook attachment move. An upper guide bar 114 may be provided on the conveyor assembly 116 above the track 124 to assist in guiding movement of the translational member 128.

Figure 9:
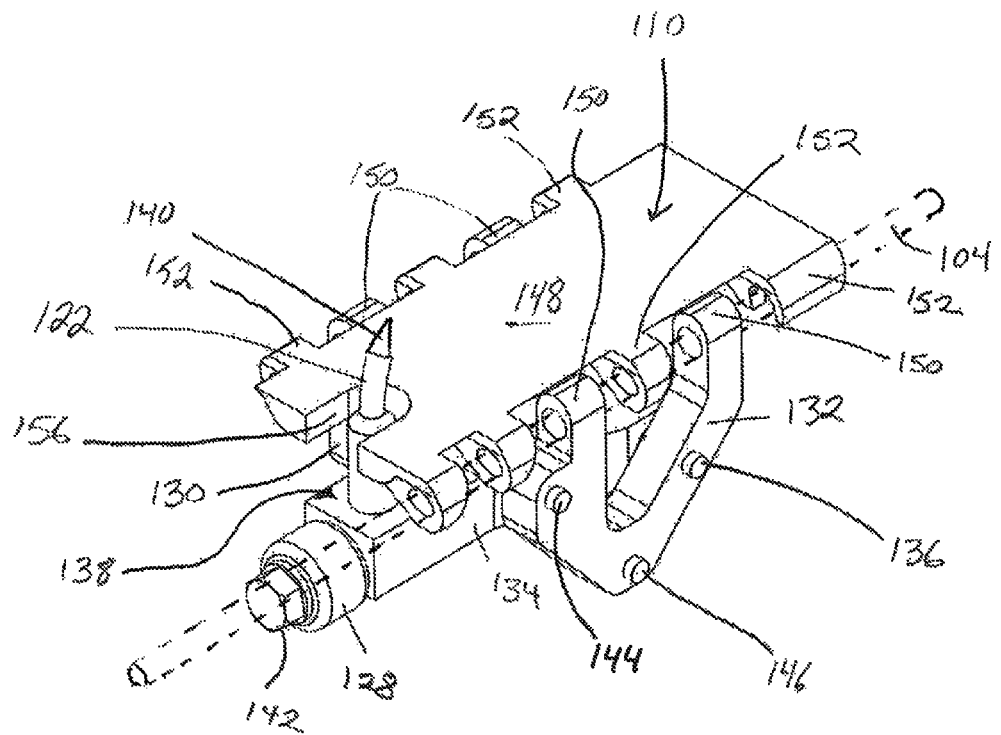
FIG. 9 is perspective view of a belly hook attachment assembly and link having the belly hook in the raised position.
Figure 10:
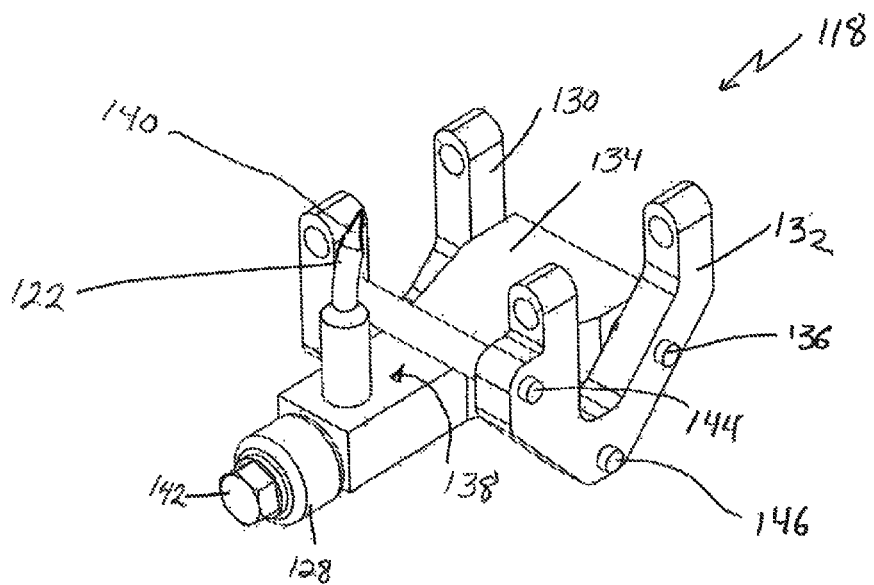
FIG. 10 is perspective view of a belly hook attachment assembly of FIG. 9, absent the link.

The belly hook attachment 118, 120 is formed of a rigid material, such as but not limited to stainless steel or plastic, but other materials suitable for the intended purpose may also be acceptable. For example, it is contemplated that the belly hook attachment may be formed of a rigid, but sufficiently strong plastic material. For purposes of ease of discussion, only the belly hook attachment 118 will be further described in detail herein. However, the discussion and features described apply equally to belly hook attachment 120. As shown in FIGS. 9-10, the belly hook attachment 118 has a first support arm 130 and a second support arm 132. The support arms 130, 132 are interconnected by cross bars or pins. Each support arm 130, 132 has one or more receptors, and in the illustrated embodiment, first and second receptors extending through an upper portion of the support arm. The receptors are sized to receive a hinge pin 104 therethrough. The belly hook attachment 118 has a belly hook support arm 134 connected to the support arms 130, 132 by one of the cross bars or pins 136, 144, 146. In the illustrated embodiment, a pin 136 extends through the first and second support arms 130, 132, and through an aperture in the belly hook support arm 134. The belly hook support arm 134 carries a belly hook 122 which extends from an upper surface 138 of the belly hook support arm 134 and has a sharpened end 140 or tip. The belly hook 122 may be a hook or pin and may be configured to pierce product carried by the conveyor belt 100 and may be configured to hold product down on the conveyor belt 100. For example, the belly hook 122 may have an approximate upward facing tip or in the alternative may have an approximate horizontally facing tip. The belly hook support arm 134 also has a translational member 128 for translating movement of the arm 134 between raised and lowered positions. The translational member 128 may be a wheel, a bearing, a slide or any suitable mechanism accomplishing the same purposes. The translational member 128 in the Figures is a wheel. The translational member 128 in the Figures is secured by attachment device 142, such as but not limited to a bolt or screw to the belly hook support arm 134.

Figure 13:
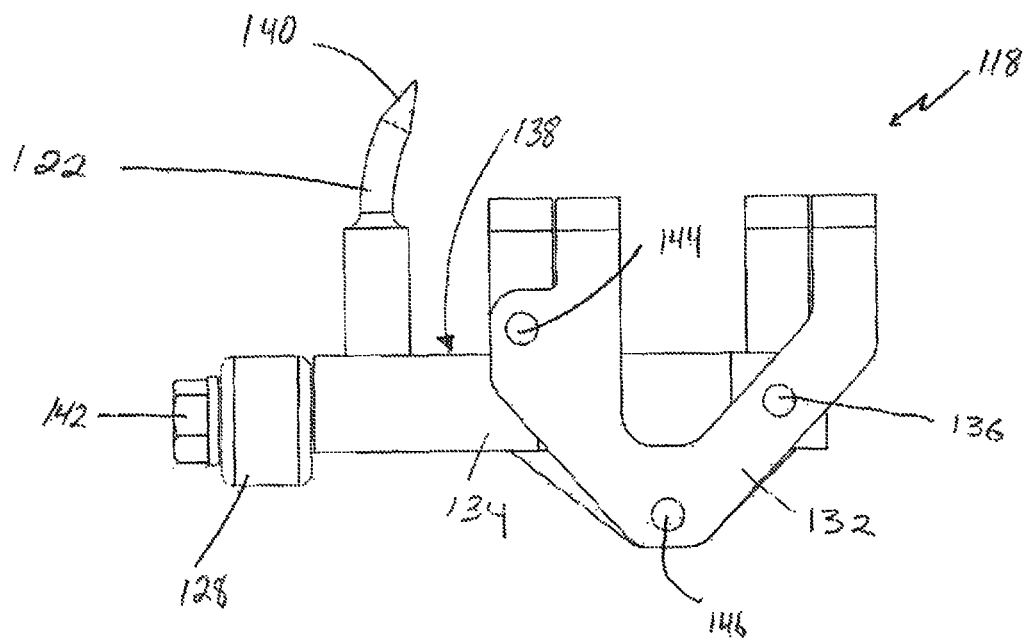
FIG. 13 is an end perspective view of the belly hook attachment assembly shown in FIG. 10, with the belly hook in the raised position.
Figure 14:
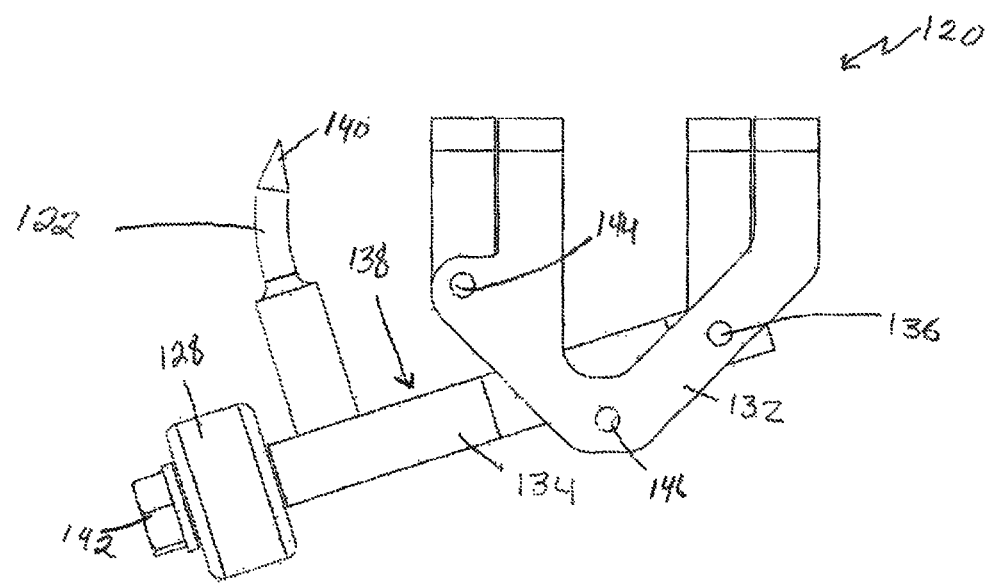
FIG. 14 is an end perspective view of the belly hook attachment assembly shown in FIG. 10, with the belly hook in the lowered position.

The belly hook support arm 134 is pivotable about the pin 136. Further, the belly hook support arm 134 is pivotal between the upper pin 144, which serves as a stop against upward pivotal movement of the belly hook support arm 134, and a lower pin 146, which serves as a stop against downward pivotal movement of the belly hook support arm 134 (see FIGS. 13-14).

Figure 11:
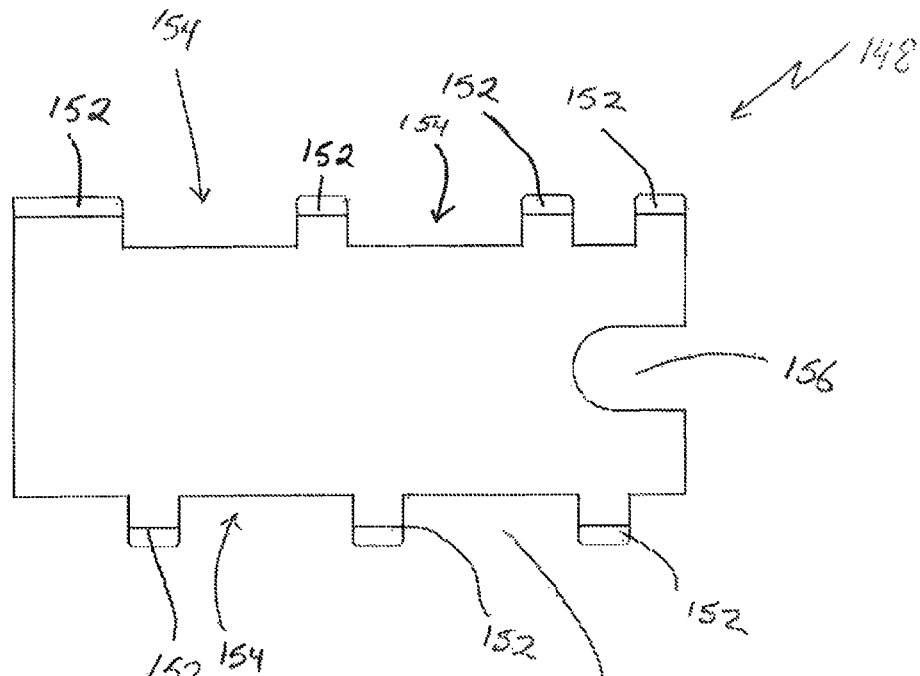
FIG. 11 is a top plan view of the link shown in FIG. 9, absent the belly hook attachment assembly.
Figure 12:
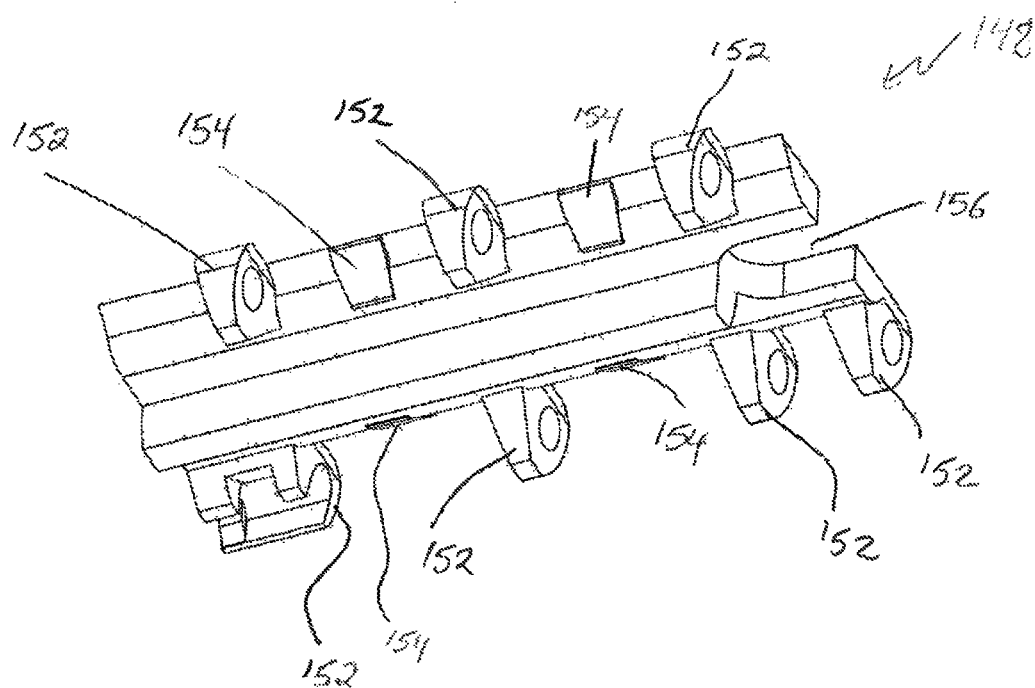
FIG. 12 is a bottom perspective view of the link shown in FIG. 11.

The belly hook attachment 118 is secured to an attachment link 148 connected to the conveyor belt 100 (FIG. 9). Each receptor 150 of the belly hook support arms 130, 132 is aligned with receptors 152 on the attachment link 148. The attachment link 148 in the illustrated embodiment includes a series of aligned receptors 152 along each side of the link. Each series includes an open space 154 in the series which receives a segment or receptor 150 of the first support arm 130 or second support arm 132. An adjacent modular conveyor belt link 102 may have receptors 108 or be otherwise interleaved with the receptors 150, 152 of the attachment link 148 and aligned belly hook attachment support arms 130, 132 and the combination secured in place by a hinge pin 104 inserted through the receptors 108, 150, 152. As shown in FIGS. 11-12, the attachment link 148 also has an aperture extending though the link, extending through the conveying surface 110, arranged to permit passage of the belly hook 122 therethrough (see FIG. 9). While the aperture is positioned in one link in the Figures, the aperture or a plurality of apertures may be provided on multiple links, such as on adjacent links.

In operation of the one or more examples of embodiments, a conveyor assembly 116 is provided. As shown in FIGS. 5-8, the conveyor assembly 116 has a carryway 126 which supports a modular conveyor belt 100 on the conveying side of the conveyor and on the return side of the conveyor may have one or more return rollers (not shown). One or more sprockets (not shown) may be provided and engage the belt 100, transmitting motion to the belt 100 through a drive (not shown) or other suitable mechanism. The conveyor assembly has a track 124 seated below the carryway 126 and/or belt 100. The track 124 may extend the length of the conveyor or may be positioned along a segment of the conveyor. In one or more examples as illustrated in FIGS. 5-8, the track 124 is positioned along a segment of the conveyor. The belly hook attachment 118, 120 is in its rest state, with the hook 122 seated based upon gravity. In other words, on the conveying side of the conveyor, the hook 122 and in particular the belly hook attachment 120 is in a resting state in the lowered position. On the return side of the conveyor, the resting state for the hook 122 and belly hook attachment 118 is in the raised position.

As the conveyor belt 100 moves, the attached belly hook attachment or plurality of belly hook attachments 118, 120 move in unison with the belt 100. The belly hook attachment 120 travels with the belt 100 in its rest position until it reaches the track 124. On the conveying side of the conveyor, in its rest position the belly hook attachment 120 is in its lowered position with the hook 122 is recessed within the link. The translational member 128 then engages the track 124 and moves or rolls along the track 124 following the track path. The track 124 shown in the Figures has a ramp 158 or inclined portion and a straight portion 160 connected to the ramp 158. When the wheel or translational member 128 engages the ramp 158, it moves along the ramp 158 in the direction of movement of the belt 100. The wheel or translational member 128 travels up the inclined surface of the ramp 158. While not shown in the Figures, it is noted that the ramp 158 may be or include a declined surface. As the assembly moves, the belt 100 and attachment link 148 carrying the belly hook attachment 120 remain in the same travel path or plane. However, as a result of the travel of the translational member 128 along the inclined surface of the ramp 158, the hook 122, namely, the belly hook support arm 134 carrying the belly hook and translational member 128, move in a vertical direction, moving the hook 122 above the conveying surface 110 of the belt 100 (see belly hook attachment 118). The inclined portion 158 of the track 124, at its top connects to a straight track segment 160. The translational member or wheel 128 moves from the inclined segment 158 of the track 124 to the straight segment 160. In the Figures, when the wheel or translational member 128 positioned on the straight portion 160 or segment of the track 124, the belly hook attachment is in its raised position (see FIG. 13), the hook 122 being positioned above the conveying surface 110 (see attachment 118). In this position, an operator can hook a product onto the hook 122. Optionally, the conveyor may have one or more additional track segments, such as an adjacent ramp and/or straight segment which moves the hook 122 to a lowered position thereby tightening the hold on the product attached to the hook 122. Once product is removed, the hook 122 can be lowered into the recess or aperture 156, and the belly hook attachment into its lowered position (see FIG. 14, attachment 120), either by the absence of a track and allowing the belly hook attachment to move into its rest state, or by a declined ramp and lower positioned track.

The belly hook attachment 118, 120 described herein provides a hook attachment or assembly that pivots to move a belly hook 122 up and down through an aperture 156 in a link of a plastic modular conveyor belt 100.

The belly hook attachment and modular conveyor belt described herein provide several advantages over currently available devices. The belly hook attachment is easy to install, use, and maintain in a sanitary condition with a modular conveyor belt. Moreover, the belly hook engages the product from below the conveyor belt and conveying surface. Thus, the attachment and belt eliminate the need for an additional belt or system over the top of the conveyor belt used to hook product. The belly hook which is engaged from below the product does not present obstacles for an operator who must cut the meat product, or to machinery through which the meat product must pass. Moreover, the attachment and belt are less costly as it is not necessary to install an additional belt system and the belly hook attachment is less costly to operate and maintain than currently available systems as each individual belly hook can be separately serviced. The belly hook attachment and belt to which it is attached is easier to clean than currently available devices as it has fewer components, is carried below the conveying surface of the belt, and has a number of openings allowing easy access and cleaning. Furthermore, the belly hook attachment connects to a modular plastic conveyor belt, avoiding the problems of current belly hook systems that are prone to bind or jam, are heavy, and are generally cumbersome to install and use. The belly hook assembly disclosed is easy to install, use, and maintain in a sanitary condition with a modular conveyor belt.

Presently preferred embodiments of the invention and many of its improvements have been described with a degree of particularity. The previous description is of preferred examples for implementing the invention, and the scope of the invention should not necessarily be limited by this description. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, angled, and so forth) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

What is claimed is:

1. A belly hook attachment comprising;

a first support arm;

a second support arm spaced from the first arm, the first support arm and second support arm receiving first, second and third pins;

a belly hook support arm carried by the first pin and pivotable about the first pin;

a belly hook carried by the belly hook support arm;

a translational member carried by the belly hook support arm and engagable with a track on a conveyor assembly such that the interaction between the track and the translational member results in pivotal movement of the belly hook support arm about the first pin between the second pin forming an upper stop and third pin forming a lower stop, thereby moving the belly hook.

2. The belly hook of claim 1, wherein the translational member is a wheel.

3. The belly hook of claim 1, wherein the translational member is a slide.

4. A modular conveyor belt comprising:
a plurality of links secured together by laterally disposed pins to form a conveyor belt;
a belly hook link having an aperture; and
a belly hook attachment having a first support arm, a second support arm spaced from the first arm, the first support arm and second support arm receiving first, second and third pins, a belly hook support arm carried by the first pin and pivotable about the first pin, a belly hook carried by the belly hook support arm, a translational member carried by the belly hook support arm and engagable with a track on a conveyor assembly such that the interaction between the track and the translational member results in pivotal movement of the belly hook support arm about the first pin between the second pin forming an upper stop and third pin forming a lower stop, and resulting in corresponding movement of the belly hook between a lowered position in which the belly hook support arm is in contact with the third pin and the belly hook is recessed below a top surface of the conveyor belt in the aperture, and a raised position in which the belly hook support arm is in contact with the second pin and a portion of the belly hook is extended through the aperture above the top surface of the conveyor belt.

5. The modular conveyor belt of claim 4, wherein the plurality of links are formed of a plastic material.

\* \* \* \* \*